Sept. 6, 1927.  F. W. WOOD  1,641,940
SYNCHRONOUS CLOCK SYSTEM
Filed Aug. 22, 1923  3 Sheets-Sheet 1

INVENTOR
Frank W. Wood
BY
Meyers & Cavanagh
ATTORNEYS

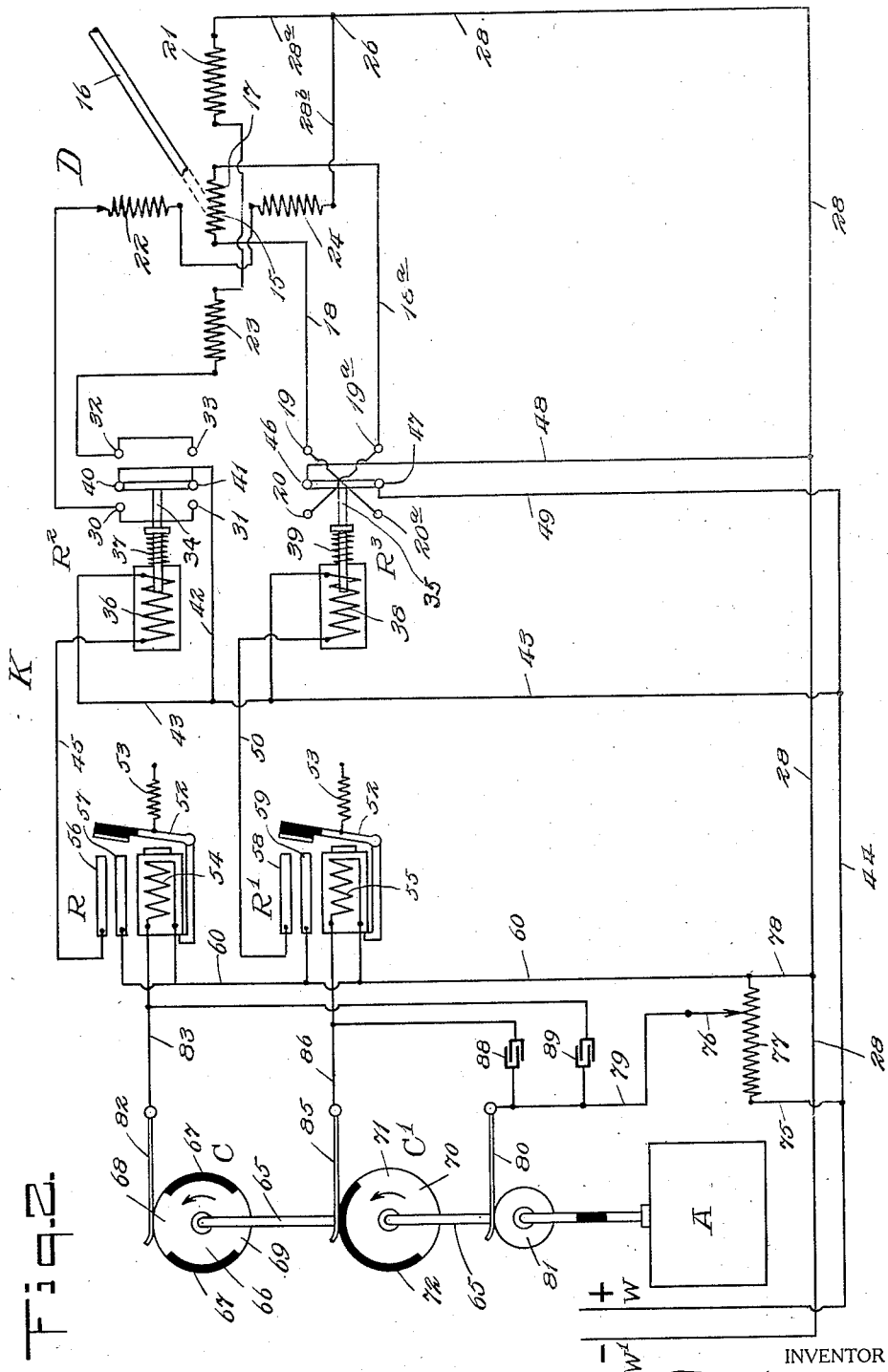

Sept. 6, 1927.  1,641,940
F. W. WOOD
SYNCHRONOUS CLOCK SYSTEM
Filed Aug. 22, 1923   3 Sheets-Sheet 3

INVENTOR
Frank W. Wood
BY
Meyers & Cavanagh
ATTORNEYS

Patented Sept. 6, 1927.

1,641,940

UNITED STATES PATENT OFFICE.

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK.

SYNCHRONOUS CLOCK SYSTEM.

Application filed August 22, 1923. Serial No. 658,662.

My invention relates to a clock system or mechanism including one or any desired plurality of secondary clocks and a primary or master clock, so constructed and arranged that each pointer of each secondary clock is at all times controlled or positioned in accordance with a corresponding controlling instrumentality or "transmitter" in the primary clock.

In secondary clock systems up to the present time it has been customary to connect the pointers (hands) of each secondary clock by suitable gearing or equivalent connections to move at the proper relative speeds, and to drive each secondary mechanism practically as a unit by impulses transmitted from the primary clock; for instance, by means of an electro-magnet and ratchet mechanism, the electro-magnet in each secondary clock being in circuit with a transmitting element or circuit closer in the primary clock, so that each secondary mechanism is driven as a unit by successive impulses. This arrangement leads to various difficulties including the following:

If any trouble arises in the circuit connections or driving mechanism of a particular secondary clock, it will get out of step with the others and this fact may not be noted, or if noted the difficulty must be corrected by resetting or resynchronizing the secondary clock. If current in the main circuit or circuits is interrupted at any time it is usually necessary to reset or synchronize all of the secondaries when the circuit is re-established. When the circuit is in proper condition it is possible to set all of the secondary clocks ahead simultaneously but it is impossible to set them back, except by stopping the primary clock or transmitting mechanism and allowing the necessary time to elapse before the primary mechanism is restarted. This difficulty is especially noticeable on board ship where it is necessary to reset the clocks daily in accordance with the longitudinal position of the ship.

To avoid the above stated and other disadvantages of present systems, and to realize certain advantages sufficiently stated hereinafter, the present system or mechanism comprises, as briefly described, one or usually a plurality of secondary clocks, each of which includes a plurality of electrically energized instrumentalities which may otherwise be identified for convenience as "motors", each of these motors being connected to one of the clock hands; and there is no mechanical connection between the individual motors and no gear train connecting the hands. These secondary clocks operate in connection with a primary or master clock including a plurality of electrical transmitting instrumentalities, for example, a second, minute and hour transmitter, and suitable means for driving the transmitters in proper speed relation to each other and in proper clock time. The individual transmitters may be connected mechanically to move at proper relative speeds, and a primary driving element of the gear train or other connections may be driven in any suitable way at a proper speed, for instance, it may be moved once each second through six circular degrees, and each other transmitter will then be moved by the gear connections a corresponding distance, that is, the minute transmitter will be moved one-tenth of a circular degree and the hour transmitter will be moved 1/120 of a degree (.00833°). Otherwise, each transmitter may be independently driven by suitable timing or control mechanism at proper intervals to position it with the desired frequency.

In either case, each transmitter has suitable circuit connections to the corresponding synchronous motors of all of the secondaries; for instance, the "second" transmitter of the primary is in circuit with the "second" motors of all of the secondaries, the "minute" transmitter is in circuit with the "minute" motors of all of the secondaries, etc.

The transmitters and motors are of any known or suitable type in which the receiving instrumentality or motor responds at all times to movements of the transmitter; or in other words, is positioned synchronously with the transmitter. Synchronous electrical devices of this class are sufficiently represented by known transmitters and synchronous receivers or motors of the alternating type, as sufficiently illustrated and explained in the following detail description; although any suitable electrical instrumentalities may be employed for this purpose.

Since each hand of every secondary clock is at all times controlled by and synchronized with one of the primary transmitters, all of the secondaries may be reset at any time by merely resetting the primary clock. If there is any disturbance in the circuits of one secondary clock, the hands of that clock will be automatically, immediately and correctly repositioned as soon as the circuit difficulty is remedied, unless one or more of the secondary hands is angularly displaced one full revolution in relation to the corresponding hand of the master clock; and if current is interrupted in the entire secondary clock circuit, all the secondaries are automatically and immediately positioned in correct time, as soon as the circuit is restored, unless any set of corresponding hands of all the secondaries, such, for instance, as the "second" hands, are displaced angularly at least one full turn in relation to the position of the corresponding primary clock hand. In such a case, however, it is only necessary to interrupt the circuit which provides for synchronous action of the primary transmitters and the secondary motors, and move the transmitters to agree with the positions of the hands of the secondaries, to then reestablish the synchronous circuit, and to move the primary transmitters to the correct time positions; and during that movement the secondaries will all follow, and when the correct indication has been reached the automatic operation of the primary transmitters is resumed. Also, there is no difficulty in setting the secondaries backward as well as forward, since this may be accomplished by merely turning back the primary transmitters simultaneously, if they are geared together, or individually if the primary transmitters are independently controlled.

The invention also includes novel propelling or controlling devices or mechanism for the primary transmitters, the characteristics and advantages of which sufficiently appear from the following detail description of representative systems embodying the invention.

After considering these examples, persons skilled in the art will understand that many variations may be made within the principles of the invention, and I do not limit myself to details, except as claimed.

Figure 2 is a diagrammatic view of one suitable master-clock driving or controlling mechanism.

Figure 1:
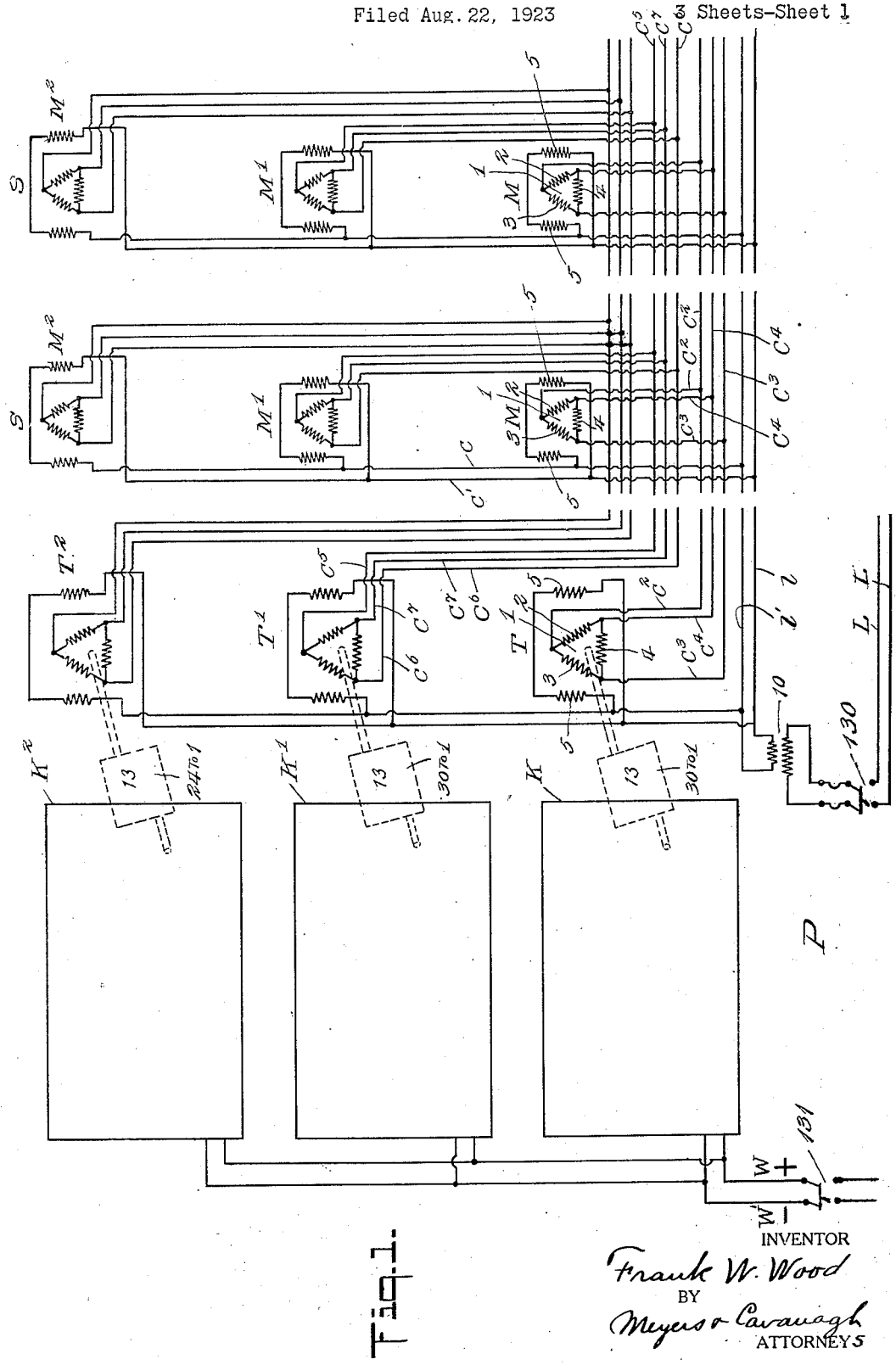
Figure 1 is a diagram sufficiently illustrating one synchronous clock system embodying the invention.

In Figure 1, which illustrates diagrammatically a complete system embodying the invention in one form, P is a primary or master clock and S, S are two of any desired plurality of secondary clocks. The primary clock includes a plurality of electrical instrumentalities T, $T^1$ and $T^2$ which may conveniently be designated as "transmitters," and each secondary clock includes a corresponding plurality of electrical instrumentalities M, $M^1$ and $M^2$ conveniently designated as "motors" or "receiving devices," each of which is synchronized with a corresponding one of the transmitters; for example, the motor device M of each secondary is synchronized with the transmitter T, motors $M^1$ are synchronized with transmitters $T^1$, etc. The particular devices diagrammatically shown represent known forms of synchronous alternators, each of which includes an armature 1 having three coils or windings 2, 3 and 4, and two field coils 5. The field coils of each motor and transmitter are connected in series, and each field is connected by means of conductors $c, c'$ to line conductors $l, l'$ of the synchronous system, that is to say, conductors $c, c'$ connect the field circuits of all the transmitters and motors in parallel relation.

The armature winding of each transmitter is connected in symmetrical fashion to the armature windings of the corresponding motors; for instance, the armature winding of transmitter T is connected symmetrically to the armature windings of the motors M of all the secondary clocks by conductors $c^2$, $c^3$ and $c^4$, the connections of all of the armatures being in parallel relation; the armature winding of transmitter $T^1$ is similarly connected to the armature windings of motors $M^1$ by conductors $c^5, c^6$, and $c^7$, and so on.

The system is energized in any suitable way, for instance, by 125 volt, 60 cycle alternating current applied through line wires L, $L^1$ and this may be stepped down by a suitable transformer to say, 50-volt, single phase, 60 cycle current on the internal wires $l, l'$ of the synchronous system. Whenever current is applied as stated, the rotation of the armature 1 of any transmitter, such as T, causes synchronous rotation of the armatures 1 of all motors M in circuit with that transmitter armature, or in other words, the motor armatures are always positioned in accordance with the position of the transmitter armature the system is evidently not affected adversely by voltage variations. A suitable clock dial (not shown) is supplied for each secondary clock S, and the armature or other movable part of each synchronous motor M, $M^1$ and $M^2$ of each clock is connected in any suitable way to one of the clock hands, and whether these connections are direct or through gearing, there need be no gear or other mechanical connection between the different motors, motor armatures, or hand-driving devices of the secondary clock. Motor M of each secondary is connected to the second hand, $M^1$ to the minute hand and $M^2$ to the hour hand of the secondary clock dial.

The described synchronous electric instrumentalities are only representative of any known or suitable synchronous devices that may be employed for the purpose.

A great variety of driving or controlling devices may be employed to move the different transmitters of the primary clock through suitable angles at the proper intervals. In the arrangement shown in Figure 1, the armature 1 of each transmitter is mechanically connected by means of its shaft 12, with interposed gearing 13 when necessary, to a suitable driving or controlling mechanism, these mechanisms being graphically indicated in Figure 1 in which the rectangle K represents a casing containing driving or controlling mechanism for transmitter T, $K^1$ represents mechanism for transmitter $T^1$, $K^2$ similar mechanism for transmitter $T^2$. All the controlling or driving mechanisms may be substantially identical in structure, although they may be controlled or driven at different speeds, intervals, or time-rates. Figure 2 shows one of the mechanisms, such as K, diagrammatically.

While in a broad aspect of the invention any suitable driving or controlling mechanism may be used, it is usually desirable for various reasons to provide electrical, or at least electrically controlled driving mechanism of which the present instrumentalities K, $K^1$ etc., are representative in a broad sense, but also include particular features which are preferred in many cases. In the present particular driving mechanism, therefore, electrical contact members C, $C^1$, are employed to control through suitable relays R, $R^1$, $R^2$ and $R^3$ a suitable electric driving motor D.

While any suitable motor may be employed, in the present instance the motor is of a type which may be described as a direct-current, multipolar motor, of which the armature 15 is mounted on a shaft 16 which is connected to the armature of transmitter T, in the present instance, through gearing 13, Figure 1. The armature has a coil 17, the ends of which are connected by conductors 18, $18^a$ to fixed contacts 19, $19^a$, 20 and $20^a$ of the pole-changing relay $R^3$. The motor also has field coils 21, 22, 23, and 24, equally spaced about the armature, and opposite coils such as 21 and 23 are connected in series and wound so that their ends confronting the armature have opposite polarities, and so also with respect to the coils 22 and 24. One terminal of each pair of field coils is connected to a fixed contact of a suitable secondary relay $R^2$ and the other terminal of each pair is connected to a suitable source of current. Specifically, the outer terminals of coils 21 and 24 are connected at 26 to a conductor 28 which is connected to negative line wire $W^1$. The outer terminals of coils 22 and 23 are connected respectively to contacts 30, 31 and 32, 33 of secondary relay $R^2$, which controls the field coil circuits.

Relays $R^2$ and $R^3$ may be of a similar type, in which the movable elements are armatures 34 and 35 respectively are moved in one direction by the magnet coil and in the other direction by a spring; thus the armature of relay $R^2$ is moved one way by its coil 36 and this movement is resisted and the armature is moved in the opposite direction when the magnet is deenergized by a spring 37; and similarly the armature of relay $R^3$ is controlled by a solenoid 38 and spring 39. The movable member 34 of relay $R^2$ has connected contacts 40 and 41 to cooperate with fixed contacts 30, 32 and 31, 33 respectively, and both of the contacts 40, 41 are connected by a conductor 42 to a conductor 43. This conductor leads from a conductor 44 which in turn is connected to positive line wire W, and conductor 43 is also connected to one terminal of solenoid 36; the other solenoid terminal is connected by a conductor 45 to primary relay R.

The movable element 35 of pole changing relay $R^3$ has contacts 46 and 47 cooperating respectively with fixed contacts 19, 20 and $19^a$, $20^a$. Movable contact 46 is connected by a conductor 48 to conductor 28, and contact 47 is connected by a conductor 49 to conductor 44. One terminal of relay solenoid 38 is connected to conductor 43 and the other terminal is connected by a conductor 50 to primary relay $R^1$.

The relays R and $R^1$ may be of similar type, including a movable element or armature 52 normally retracted by a spring 53. Relay R has a solenoid 54 and relay $R^1$ has a solenoid 55. Relay R has spaced contacts 56 and 57 adapted to be closed by a contact member on the relay armature and relay $R^1$ has spaced contacts 58 and 59 adapted to be closed by a contact member on the relay armature. Conductor 45 previously mentioned is connected to contact 56 and conductor 50 is connected to contact 58. Contacts 57 and 59 are connected to a conductor 60 which leads to conductor 28.

The primary relays R and $R^1$ are controlled by the contact members C and $C^1$ which, in the present instance, are metal discs on a shaft 65 which is driven by any suitable clockwork, sufficiently indicated at A. The discs may be electrically connected with the shaft, and disc 66 is arranged in any suitable way, for instance, by inserting segments 67 of insulating material, to provide two radially opposite contact members 68 and 69. Disc 70 has a single contact surface 71 extending throughout one-half of its circumference, the other half of the circumference consisting of a segment 72 of insulating material. Current is supplied to the rotary contact discs by a conductor 75 leading from positive line W or from conductor 44, through the adjustable element 76 of a potentiometer 77, the other terminal of which is connected to the negative side of the line by a conductor 78, and a conductor 79 leading from the movable element 76 to a brush 80 engaging a slip ring or contact ring 81 on shaft 65. A contact brush 82 engages the periphery of discs 66 and is connected by a conductor 83 to one terminal of solenoid 54 of relay R. The other solenoid terminal is connected to conductor 60 previously mentioned, which runs to one terminal of potentiometer 77 or in other words, is practically continuous with conductor 78.

A contact brush 85 bears on the periphery of disc 70, and is connected by conductor 86 to one terminal of solenoid 55 of relay $R^1$. The other terminal of the solenoid is connected to conductor 60 just above mentioned. To reduce sparking between brushes 82 and 85 and their moving contact members, suitable condensers may be provided, for example, a condenser 88 is connected "across" brush 85 and its contact disc 70, and a condenser 89 is connected "across" brush 82 and its disc 66.

The different controlling mechanisms may be operated in different ways in accordance with the frequency of driving impulses desired, the desired rotative speed of shaft 65, the number of contacts per revolution, and also in some cases with regard to other parts of the mechanism, such as the relay and driving motor arrangement.

In the present particular mechanism the clock-driven shaft 65 may be rotated once in two seconds. One contact per second is therefore established between disc 66 and brush 82. In the position shown in Figure 2, contact has been established between contact segment 68 and the brush. A circuit from positive line W through conductor 44, potentiometer 77, conductor 79, brush 80, shaft 65, conductor 83, solenoid 54, conductors 60 and 78, and conductor 28 to negative line $W^1$ is therefore closed, and solenoid 54 will attract armature 52 and bridge the gap between contacts 56 and 57 of relay R. At this time relay $R^1$ is deenergized by reason of brush 85 resting on insulated segment 72 of disc 70. The movement of armature 52 closes the circuit of field controlling relay $R^2$, this circuit being from one terminal of solenoid 36 through conductor 45, to contact 56, to contact 57, to conductor 60, to conductor 78 and so to negative line $W^1$ and from positive line W through conductor 44 and conductor 43 to the other terminal of the solenoid. The energizing of solenoid 36 pulls the armature 34 to the left against the pressure of spring 37, and movable contacts 40 and 41 are brought in contact with fixed contacts 30 and 31 of secondary relay $R^2$.

Previous to this action armature 15 of driving motor D was held in the position shown by magnetic effect of field coils 21 and 23, the circuit of which was closed between contacts 32 and 33 by the movable contacts 40 and 41, the circuit being from the outer terminal of coil 23 to contacts 32 and 33, to contacts 40 and 41, from conductors 42, 43 and 44, to positive line W and from negative line $W^1$ through conductors 28, and $28^a$ to the outer terminal of coil 21. The energizing of solenoid 36, however, interrupted the stated circuit and energizes coils 22 and 24, the circuit being from the outer terminal of coil 22 to contacts 30 and 31, to contacts 40 and 41, to conductor 42, to conductor 43, to conductor 44 and the positive line W and from negative line $W^1$ and conductors 28 and $28^b$ to the outer terminal of coil 24.

Previous to the stated action of relay $R^2$, armature coil 17 was energized to retain the coil and its armature in the position shown by the flux of coils 21 and 23, by the location of the armature 35 of relay $R^3$ to the right in Figure 2, closing the circuit controlled by such armature, this circuit being from one terminal of the coil through conductor 18, to contact 19, to contact 46, to conductor 48, to conductor 28 and negative line $W^1$ and from the positive line W through conductors 44 and 49, to contact 47, to contact $19^a$ and through conductor $18^a$ to the other coil terminal. This circuit is not disturbed and the polarity of the armature coils remains the same when movable element of relay $R^2$ moves to the left, as above described, and the armature is attracted by coils 22 and 24 and moves clockwise one quarter turn to a vertical position. While circuit through coils 22 and 24 is maintained by the maintenance of the armature relay $R^2$ in the left hand position, by reason of contact segment 68 of disc 66 still remaining in contact with brush 82, the further rotation of shaft 65 brings contact segment 71 of disc 70 in contact with brush 85.

Solenoid 55 of relay $R^1$ is thereupon energized, the circuit being from one terminal of the solenoid through the conductor 86 to brush 85, to disc 70, through shaft 65 to brush 80, to conductor 79, to potentiometer 77, to conductor 75 and so to positive line W and from the negative line $W^1$ through conductors 28, 78 and 60 to the other terminal of the solenoid. Armature 52 is thereupon attracted by the solenoid and closes the circuit of relay $R^3$ between the contacts 58 and 59, the circuit being from one terminal of solenoid 38, through conductor 50 to contact 58, to contact 59 and through conductors 60, 78 and 28 to the negative line and from the positive line through conductors 44 and 43 to the other solenoid terminal. The armature or relay $R^3$ is thereupon moved to the left breaking the circuit between contacts 19 and 46 and between contacts 19ª and 47, and establishing a reversed circuit to armature coil 17 from the positive and negative line wires and contacts 46 and 47 to contacts 20 and 20ª respectively and from the last named contacts through conductors 18 and 18ª to the coil.

At about the same instant that solenoid 38 is energized, contact segment 68 of disc 66 passes away from brush 82, breaking the circuit of solenoid 54 of relay R. This in turn causes the circuit of relay R² to be broken and spring 37 moves armature 34 to the right, breaking the circuit through coils 22 and 24, and reestablishing the circuit through coils 21 and 23. Since the polarity of these coils is the same whenever energized and the polarity of the armature coils has now been reversed the armature makes another step or one quarter rotation resuming the horizontal position shown in Figure 2.

It is therefor evident that in the present arrangement of mechanism, for what may be called each time impulse or driving impulse controlled by the clock mechanism A, the armature of the driving motor D makes two quarter-turns in very rapid succession, or one half-turn altogether. At the expiration of one second, contact segments 69 of disc 66 will come in contact with brush 82, and coils 22 and 24 will again be energized while the armature polarity remains the same; the armature will then make a one quarter-turn; the armature polarity will then be reversed and coils 21 and 23 again energized and the armature will make another one quarter-turn or back to the original position, and these actions are repeated indefinitely.

Considerable power is required to properly energize a suitable motor, such as D, to properly drive the transmitter armatures and the above described driving or controlling mechanism provides for supplying ample current at a substantial voltage for this purpose. The line wires W, W¹ of the driving or controlling mechanism or mechanisms may be supplied with direct current at 125 volts, as ordinarily available on shipboard or in many other places, and the full voltage may be impressed upon the motor D through suitable contacts in the relays R² and R³. At the same time it is desirable to supply a small amount of current at low voltage to the controlling contacts and this is provided for by the potentiometer 77 or other suitable or equivalent means. The primary relays R and R¹ controlled by the contacts and discs 66 and 70, and brushes 82 and 85 are arranged for operation at low voltage or with a small current flow and the secondary relays are controlled by the primary relays and may be operated at full line voltage.

In the system as illustrated in Figure 1, driving or controlling mechanism similar to that described in detail, is provided for each of the transmitters, and as also stated, the armature shaft 16 of each driving motor D, is connected in a suitable way to the corresponding transmitter armature. In the case of the "second" mechanism, where the armature of motor D rotates one half-turn per second, as above explained, the mechanical connection is effected through a gear box 13, Figures 3 and 4, in which suitable reduction gearing may be provided to drive shaft 12 at the proper rate. For example, in this particular instance, the gear reduction as between shaft 16 and shaft 12, is in the ratio of 30 to 1; therefore every time shaft 16 makes one half turn, which is once each second, shaft 12 and the second hand H thereon, Figure 4, makes one sixtieth revolution corresponding to a "second" interval on the circular "second" dial of the clock face F, Figure 4. In order to conveniently provide a reduction of 30 to 1, the reduction is made in two stages in the gearing shown in Figures 3 and 4. A pinion 100 on shaft 16 drives a larger gear 101 on a counter shaft 102, and a pinion 103 on the counter shaft drives a larger gear 104 on shaft 12, these pinions and gears being dimensioned to give the proper drive ratio. Any other suitable gearing may be provided.

In the drive mechanism for the "minute" transmitter T¹, the shaft corresponding to shaft 65, Figure 2, may be arranged to revolve once each two minutes, and when contacts are provided in the same fashion and when the reduction gearing in the gear box is the same, the armature of transmitter T¹ will be turned one sixtieth of a revolution per minute. In the driving mechanism for "hour" transmitter T², the drive shaft 65 may, to give one example, be arranged to make one rotation each 30 minutes and if it has two contact segments, one contact will be made each 15 minutes, and then with a reduction ratio of 24 to 1 in the gear box 13, the armature transmitter T² will make one twelfth revolution per hour corresponding to the hour spacing on the clock dial.

Figures 3, 4:
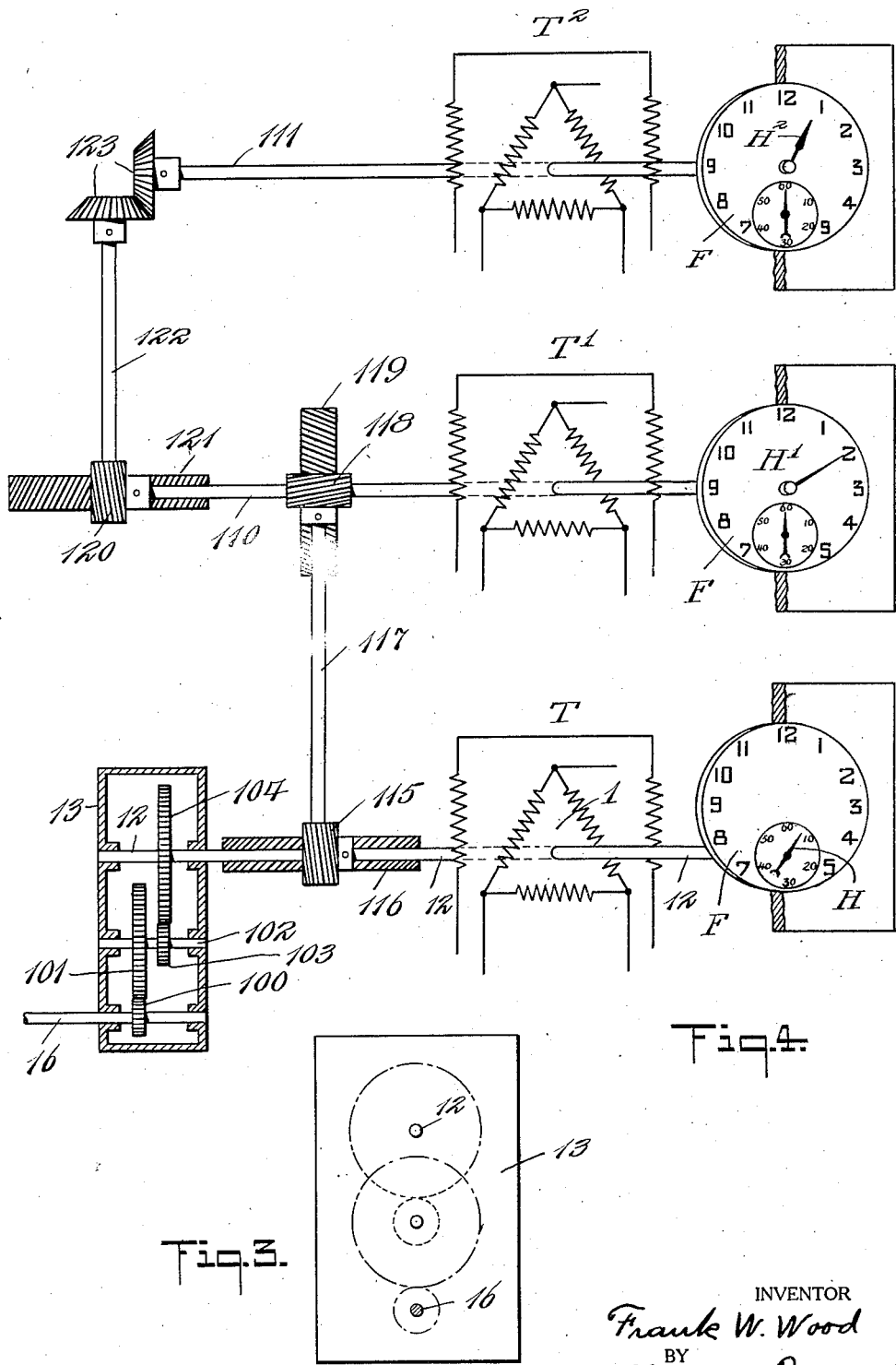
Figure 3 is a detail view of gearing employed therein.
Figure 4 is a diagrammatic representation of a modified primary or master-clock arrangement.

Figure 4 represents one modification of the system or mechanism in accordance with which one controlling or driving mechanism K, Figure 2, is employed to drive all the primary clock transmitters at the proper rates. For this purpose, the driving mechanism K drives the shaft 12 of "second" transmitter T at the proper rate, as above sufficiently explained. Armature shafts 110 and 111 of transmitter T¹ and T² respectively, are connected by suitable gearing to shaft 12, which is the primary drive shaft of all the synchronous transmitters of the primary clock. For example, shaft 110 is connected to shaft 12 by suitable gearing at the ratio of 1 to 60, or so that 60 turns of shaft 12 produce 1 turn of shaft 110. This gearing may be of any suitable kind, for example, as shown, it may be double-reduction gearing including a worm 115 on shaft 112, driving a worm gear 116 on a counter shaft 117, with a worm 118 on the countershaft driving a worm gear 119 on shaft 110. Suitable gearing connects shaft 110 to hour hand shaft 111 at the ratio of 12 to 1. Any suitable gearing may be employed, represented in this case by a worm 120 on shaft 110 driving a worm gear 121 on a countershaft 122, which is connected to shaft 111 by bevel gear 123, since in the present case a single reduction is usually sufficient, which may be provided by a single worm gear combination.

For the sake of illustrative clearness, the different countershafts 12, 110 and 111 are shown in widely-separated locations, and the clock dial F is duplicated with relation to each shaft, although in a physical embodiment of the invention the shafts will be so associated or connected to the second, minute and hour hands H, H¹ and H² that these hands will move on a single dial F, as usual.

A switch 130 is shown interposed in the line conductors L and L¹, Figure 1, for the convenient control of the synchronous circuits and a switch 131 may be provided in the direct current line conductors W, W¹ for the driving mechanism or mechanisms. It will be evident from the preceding explanation of the synchronous action of the primary transmitters and the secondary motors, that each pointer of each secondary clock will at all times be accurately positioned in accordance with the position of the corresponding pointer (hand) on the primary clock, so long as the circuits and other parts of the mechanism or system are in proper order. While a derangement may occur in one secondary clock which will cause one or more of its hands to get out of step with the primary clock as much as one revolution, and this difficulty may not be detected at the primary clock station, and resetting of the individual secondary clock may then be necessary, any disturbance which causes all of the secondary clocks to get out of step with the primary clock will be observed at the primary clock station, because one secondary clock is usually located at that station, where it can be readily compared with the dial of the primary clock. The synchronous clock circuit or the direct current driving circuit, or both, may then be interrupted by opening the corresponding switches 130 and 131, depending on the nature of disturbance, and after the trouble has been remedied, the switches may be again closed and operations resumed as usual. If all the secondary clocks have gotten out of step with the primary, the driving circuit W, W¹ may be broken while the synchronous system is energized and then the initial driving element, such as shaft 16 of the system, as shown in Figure 4, or the corresponding driving shafts of any or all of the transmitters in the system as shown in Figure 1, may be rotated, regardless of the time indicated on the primary clock dial, to bring the secondary clock pointers to proper time positions; switch 130 may then be opened and the primary clock shafts may be turned to indicate proper clock time, and then both switches 131 and 130 are closed and the secondaries will then be properly driven to show correct time until some other disturbance arises. Various ways of manipulating or adjusting the mechanism will be apparent to persons skilled in the art without further detail explanation.

I claim:

1. A synchronous clock system comprising a plurality of rotary electric transmitters, means for driving them at different time rates, and one or more secondary mechanisms each including a rotary electric motive instrumentality synchronized with one of the transmitters.

2. A synchronous clock system comprising a plurality of synchronous-type electric transmitters, means for driving them at different time rates, and one or more secondary mechanisms each including a plurality of synchronous-type electric motors, each of said motors connected to move in synchronism with one of said transmitters and constructed and arranged to maintain its synchronous position during substantial variations of circuit voltage.

3. In a synchronous clock system, a master clock comprising a plurality of rotary electric transmitters, means for moving each transmitter at a different time rate, a plurality of secondary clocks each comprising a plurality of rotary electric motive instrumentalities, corresponding motive instrumentalities of all the secondary clocks being in circuit with a corresponding one of the primary clock transmitters and synchronized therewith.

4. A synchronous clock system comprising a primary clock, a plurality of rotary secondary clocks, a rotary electric transmitter in the primary clock, means for driving it at a definite time rate, an electric motive instrumentality in each secondary clock, all of said motive instrumentalities being synchronized with said primary transmitter, another rotary electric transmitter in the primary clock, means for driving it at a different definite time rate, and another rotary electric motive instrumentality in each secondary clock connected to move in synchronism with said other transmitter.

5. A synchronous clock system comprising a primary clock, a plurality of secondary clocks, a rotary electric "second" transmitter in the primary clock, means for driving it at a definite time rate, a rotary electric "second" motor in each secondary clock, all of said motors being synchronized with said "second" transmitter, a rotary electric "minute" transmitter in the primary clock, means for driving it at a different definite time rate, a rotary electric "minute" motor in each secondary clock connected to move in synchronism with said "minute" transmitter, a rotary electric "hour" transmitter in the primary clock, and a rotary electric "hour" motor in each secondary clock connected to move in synchronism with said "hour" transmitter.

6. A synchronous clock system comprising contact mechanism driven at a predetermined time rate, a driving motor and a circuit controlled by the contact mechanism for intermittently driving the motor, a primary electric transmitter of synchronous type, a driving connection between the motor and said transmitter, a plurality of secondary clocks each including an electric motor synchronized with said primary transmitter, another primary transmitter of synchronous type, means for driving it in definite time ratio to the movement of the first transmitter, and another electric motor in each secondary clock, the last-named motors of all the secondary clocks being synchronized with the last-named primary transmitter.

Signed at New York city, in the county of New York and State of New York this 21st day of June A. D. 1923.

FRANK W. WOOD.